United States Patent [19]

Soikkeli

[11] Patent Number: 5,091,037
[45] Date of Patent: Feb. 25, 1992

[54] APPARATUS FOR THE MANUFACTURE OF INSULATING CHUTES

[75] Inventor: Osmo Soikkeli, Lappeenranta, Finland

[73] Assignee: Oy Partek Ab, Finland

[21] Appl. No.: 555,430

[22] PCT Filed: Jan. 23, 1989

[86] PCT No.: PCT/FI89/00013
§ 371 Date: Sep. 11, 1990
§ 102(e) Date: Sep. 11, 1990

[87] PCT Pub. No.: WO89/07733
PCT Pub. Date: Aug. 24, 1989

[30] Foreign Application Priority Data

Feb. 12, 1988 [FI] Finland .................. 880666

[51] Int. Cl.⁵ .............. B31C 13/00; B32B 31/00; B65H 81/00
[52] U.S. Cl. .................... 156/443; 156/184; 156/193; 156/215; 156/446; 156/457; 156/458; 156/475; 156/499; 156/510
[58] Field of Search .............. 156/184, 187, 193, 215, 156/425, 443, 446, 456, 458, 457, 475, 510; 493/303, 305, 306; 198/347.4, 378, 418.2, 418.7, 418.8

[56] References Cited

U.S. PATENT DOCUMENTS 413,995 10/1889 Wright .................. 156/510
3,253,973 5/1966 Anderberg et al. .......... 156/446
3,344,009 9/1967 Leveque .................. 156/446

Primary Examiner—David A. Simmons
Assistant Examiner—Jeffrey G. Payne
Attorney, Agent, or Firm—Scully, Scott, Murphy & Presser

[57] ABSTRACT

The invention relates to an apparatus for the manufacture of insulating chutes. The apparatus comprises means for winding plies of insulating material on to cores; means for curing the insulating material wound on the cores; means for removing cured insulating material from the cores; and means of or returning empty cores to the winding step. The object is to make the operation of this kind of apparatus more efficient than previously. The object is achieved in such a manner that the cores (12) are arranged in groups on an endless transporter (1), whereby empty spaces corresponding to the number of cores in a group are left between the groups of cores, and the transporter is arranged to move step by step a distance corresponding to the interspace between individual cores in a group when the first core in each group reaches the winding means, and a distance corresponding to the interspace between the groups when the last core in each group leaves the winding step. When the transporter is displaced a distance corresponding to the interspace between the groups, the whole group of cores is introduced into the curing means (5), in which the group of cores is detached from the transporter for the time of the curing, being thereafter returned to the following empty space on the transporter.

10 Claims, 3 Drawing Sheets

FIG. 3
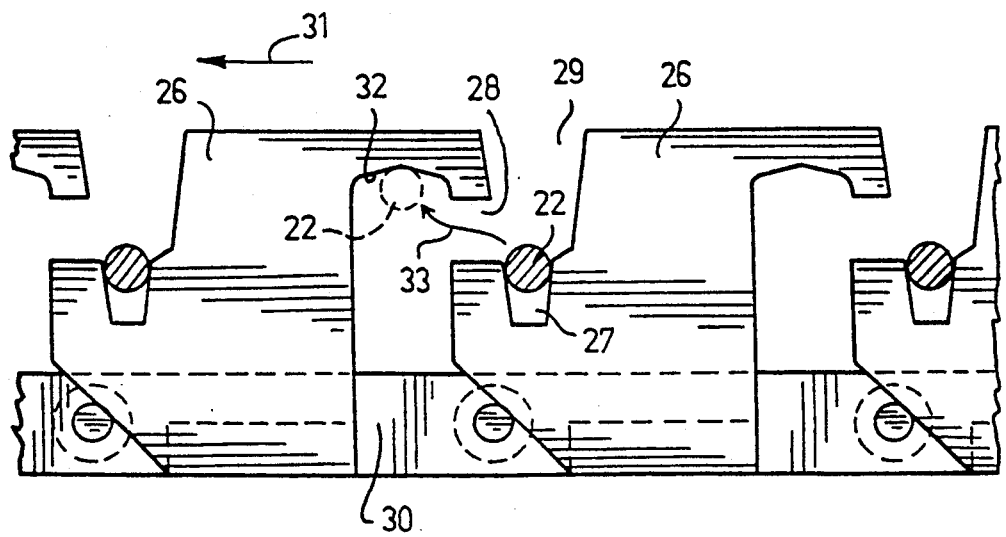
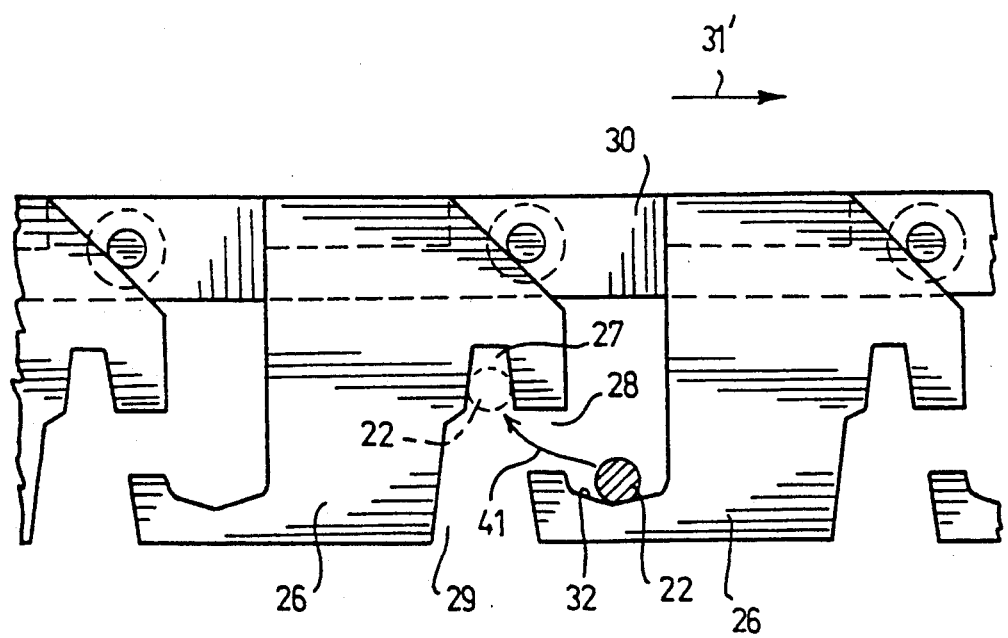
FIG. 4

APPARATUS FOR THE MANUFACTURE OF INSULATING CHUTES

BACKGROUND OF THE INVENTION

The invention relates to an apparatus for the manufacture of insulating chutes, of mineral wool in particular, comprising means for winding plies of an insulating material on to cores; means for curing the insulating material wound on the cores; means for removing the cured insulating material from the cores; and means for feeding empty rolls into said winding means.

Attempts have been made for a long time to make apparatuses of this type operate continuously and as automatically as possible. In one way or another, cores have been fed at an even rate into the winding means and further through a furnace-like curing means. The curing of an insulation, which could be compared to baking, takes place slowly, wherefore the curing furnace is very large and expensive and causes further problems as the cores have to be removed from within the insulations in order to be returned to the winding means.

SUMMARY OF THE INVENTION

The object is to provide a new apparatus for the manufacture of insulating chutes, which apparatus is simpler and more efficient than previous apparatuses.

The apparatus according to the invention is mainly characterized in that the cores are arranged in groups on an endless transporter; that the transporter comprises, between the groups of cores, empty spaces corresponding to the number of cores in each group; that the transporter is arranged to move step by step a distance corresponding to the interspace between individual cores in a group when the first core in each group reaches the winding means, and a distance corresponding to the interspace between the groups when the last core in each group leaves the winding means; and that the means for curing the insulation are arranged to cure one group of cores at a time so that it detaches the entire group from the transporter, effects the curing, and returns the group into the empty space ahead of the following group of cores on the transporter.

Means for coating and splitting the insulation are preferably positioned after the curing means, which coating and splitting means operate in synchronization with the winding means so &hat the position of the groups of cores relative to each other remains unchanged all the time, and the apparatus can operate continuously and automatically.

The curing of the insulation in each group of cores is preferably carried out by simultaneous application of compression and hot air.

In a preferred embodiment of the apparatus according to the invention, each core is detached from the transporter for the time of the winding and is thereafter returned to the transporter, whereby even insulating chutes varying greatly in thickness can be wound on to a core without interfering with the overall operation of the apparatus.

In the following the invention will be described in more detail with reference to the attached drawing.

BRIEF DESCRIPTION OF THE DRAWINGS

FIGS. 2 to 4 show a preferred embodiment of core supporting means included in the transporter of the apparatus.

DETAILED DESCRIPTION OF THE PREFERRED EMBODIMENT

Figure 1:
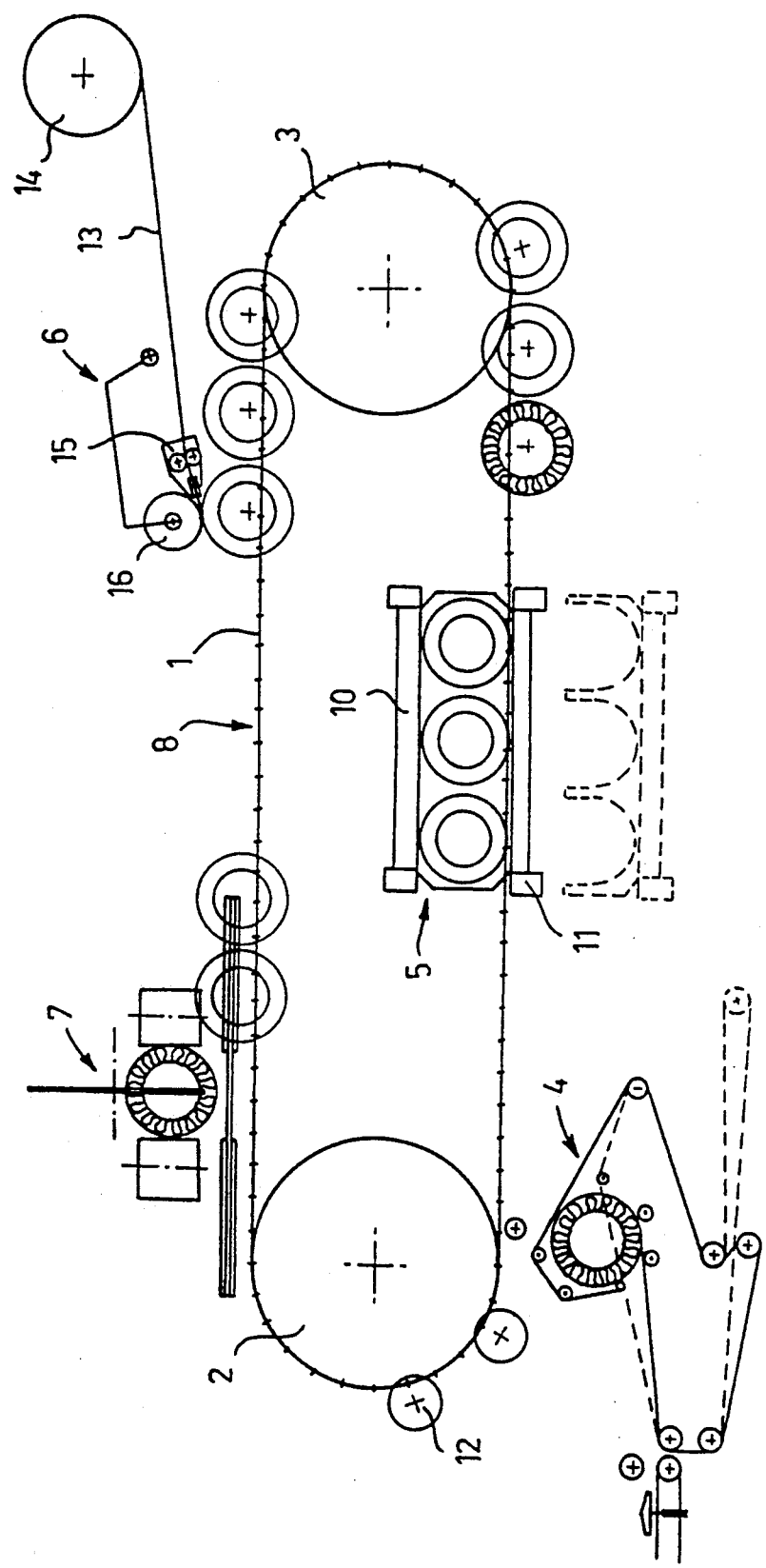
FIG. 1 is a schematical side view of an apparatus according to the invention.

In FIG. 1, the reference numeral 1 designates an endless transporter which moves around in a vertical plane via two idler wheels 2 and 3 and which may comprise two parallel chains provided with supports for detachably supporting cores 12 at both ends thereof. The reference numeral 4 designates means for winding a ply of an insulating material on to a core 12; 5 designates means for curing the insulating material; 6 designates a coating means; and 7 designates means for removing the core and for splitting the insulation into a chute.

Three successive cores 12 form a group, and an empty space 8 corresponding to three cores is left between two successive groups on the transporter 1.

When the first core 12 in a group of cores reaches the winding means 4, as shown in FIG. 1, the winding means 4 detach the core from the transporter 1 and wind the insulating material in the form of a ply on to the core to a desired thickness, and then returns the wound core to the transporter 1. Thereafter the transporter 1 moves on so that the following core reaches the winding means, etc., until the last core 12 in the group has been wound. The first core in the group has thereby been displaced in the immediate vicinity of the entrance of the curing means 5.

While one group of cores is being wound, the curing means 5 effect the curing of the insulating material wound on to a foregoing group of cores. The curing means 5 comprise a stationary upper half 10 and a movable lower half 11. The movable lower half 11 is arranged to lift one group of cores with the insulating material wound thereon away from the transporter 1 and to press the group against the stationary upper half 10. The curing is effected partly by compression, partly by hot air applied through the insulating material and the hollow cores. The curing of one group thereby takes place while insulating material is being wound on the following group of cores. After the curing has been completed, the lower movable half 11 of the curing means 5 is lowered down and the group of cores in the curing means is again positioned on the transporter 1. Thereafter the transporter 1 moves on a distance corresponding to one group of cores so that the cured group leaves the curing means 5, and a new group enters it. The interspace between the groups of cores shortens during the curing of a group of cores, but it is extended to its "normal" length as the transporter 1 passes empty the curing means 5 while the next group of cores is being wound.

The coating means 6 and the core removal and insulation splitting means 7 are preferably arranged to operate in synchronization with the winding means 4; the operation of the means 6 and 7 will be described in more detail below.

Figure 2:
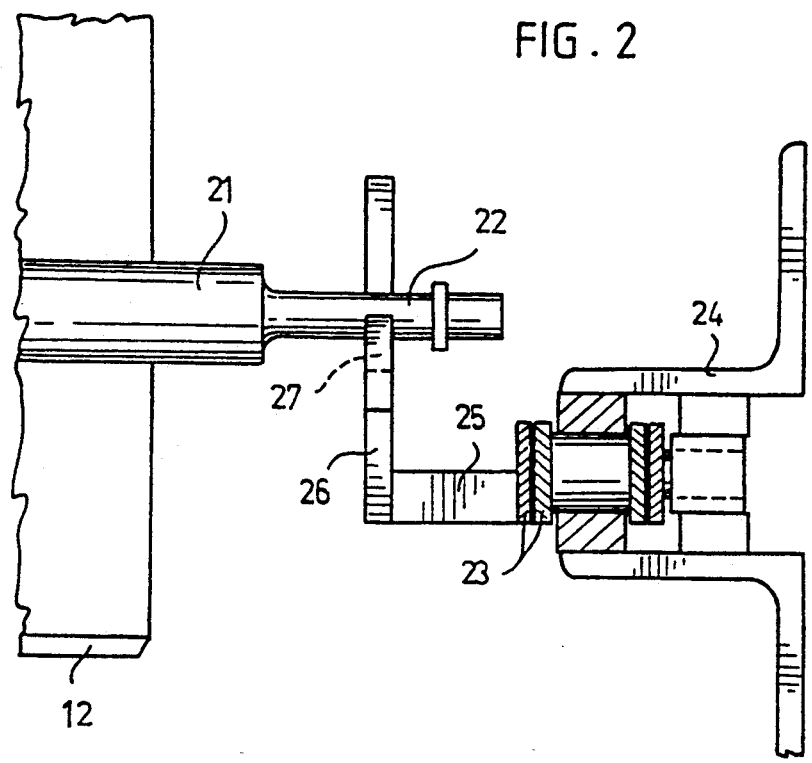

FIGS. 2, 3 and 4 illustrate the transportation of the cores 12 on the transporter 1, the cores being temporarily detachable from the transporter both at the top adjacent to the coating, core removal and insulation splitting means and at the bottom adjacent to the winding means 4 and the curing means 5.

FIG. 2 shows one end of the core 12; the reference numeral 21 designates the shaft of the core, and the reference numeral 22 a journal for supporting the shaft end.

The reference numeral 23 designates one of the chains included in the conveyer 1, and the reference numeral 24 designates means for supporting and guiding the chain 23. A core support comprising two arms 25 and 26 preferably perpendicular to each other is fixedly attached to the chain 23. The reference numeral 27 designates a support notch for the shaft journal 22, appearing more clearly from FIGS. 3 and 4.

FIG. 3 is a side view of a situation similar to that shown in FIG. 2, that is, of the upper part of the transporter shown in FIG. 1 when it moves in the direction of the arrow 31 towards the idler wheel 2. At the core removal and insulation splitting means 7, the cores 12 can be easily lifted up from the shaft journals 22 through an opening 29 so as to be detached from the transporter and can be equally easily lowered down again. When the support 26 supporting the core reaches the idler wheel 2, it tilts gradually, in the figure anti-clockwise, until the journal 22 is released from the notch 27. Under the influence of the weight of the core 12, the journal partly slides partly falls through a passage 28 into a receiving recess 32 along a path substantially coinciding with the arrow 33.

FIG. 4 shows the situation of FIG. 3 upside down, that is, in the lower half of the transporter. The movement now takes place in the direction of the arrow 31' towards the idler wheel 3. At the winding means 4, the journal 22 is lifted out of the receiving recess 32 and displaced via the passage 28 down through the opening 29. At the curing means 5, the journal 22 can be readily lifted off the transporter upwards through an opening 30 and similarly returned. When the support 26 reaches the idler wheel 3, it again begins to tilt gradually anticlockwise until the journal 22 is released from the recess 32 and is displaced into the notch 27 on the opposite side along a path substantially coinciding with the arrow 41.

Figure 5:
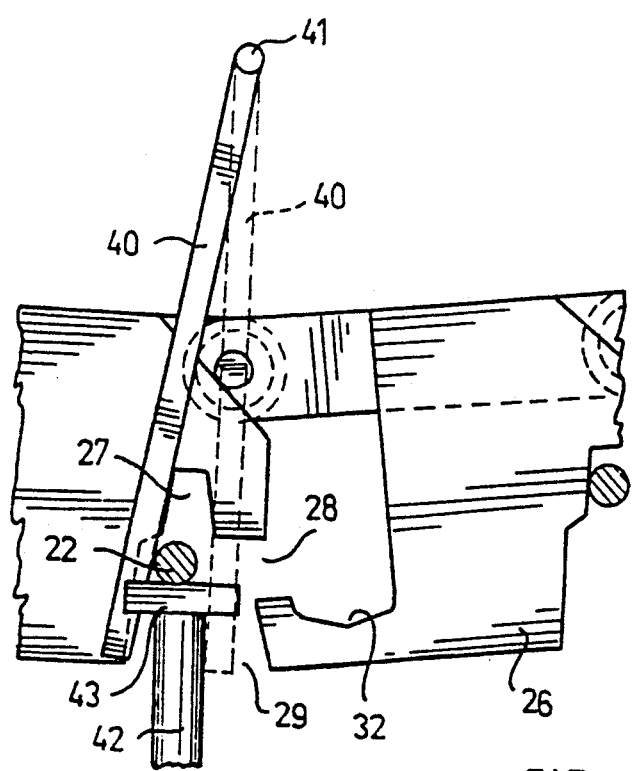
FIG. 5 illustrates the detachment of cores from the transporter and returning the same to the transporter at the winding means.

FIG. 5 illustrates schematically a solution in which the core 12 is detachable from the transporter 1 at the winding means 4 and can again be returned on to the transporter when ar insulating material layer of a desired thickness has been wound on the core.

On reaching the winding means 4, the shaft journal 22 of the core is inserted in the receiving recess 32 of the support 26. A bar provided beside the support 26 lifts the journal 22 out of the recess 32, and an arm 40 similarly provided beside the support 26 stops the journal 22 so that it will be supported by a support 43 provided at the end of a lifting arm 42. The transporter stops when the opening 29, open at the bottom, is positioned at the lifting arm 42, as shown in FIG. 5, whereby the core can be lowered down into the winding means 4. During the winding process, the transporter stays in place, and the stopping arm 40 is pivoted on a bearing 41 into the left-hand side position shown in FIG. 5. The wound core is lifted up into the opening 29 at the passage 28, whereafter the arm 40 is reinserted into the recess 32. The stopping arm 40 and the lifting arm 42 are preferably operated hydraulically.

The means 6 for coating the insulating material, operating in synchronization with the winding means 4, are preferably positioned after the idler wheel 3, as shown in FIG. 1, whereby the core supports 26 of the transporter 1 are in a position shown in FIG. 2, and the shaft journals 22 of the cores 12 are positioned in the wedge-shaped notches 27.

A coating 13 usually consists of aluminium foil. The storage roll of the coating is designated with the reference numeral 14, feeding and cutting means with the numeral 15, and a press roll with the numeral 16.

For the coating process, the shaft journals 22 of the core are lifted out of the wedge-shaped notches 27, by means of, e.g., conic supports, so that the hot roll 16 is able to rotate the core and fasten the coating foil to the surface of the cured insulating material by melting the plastic layer of the foil. The foil 13 is cut off in such a manner that a strip is formed which later on can be closed across the line along which the insulation has been sawed open. Thereafter the core is again lowered on the transporter 1, that is - the shaft journals 22 are inserted into the wedge-shaped notches 27.

The cores are not able to turn in the wedge-shaped notches 27 on their way from the coating means 6 to the sawing means 7, wherefore the insulation can be easily sawed open beside the closing strip formed by the coating. The sawing, the core removal, and the returning of the core on to the transporter 1 are carried out by means of devices known per se.

For the sake of clarity, the apparatus is shown in the drawing schematically without drive and control means. However, it is obvious to one skilled in the art how to effect cooperation between these devices.

I claim:

1. Apparatus for manufacturing insulating chutes, comprising:
    a transporter supported for movement in a forward direction around an endless path, and including means to hold a multitude of cores;
    feeding means located adjacent the endless path for feeding a supply of cores onto the transporter;
    drive means connected to the transporter to move the transporter and the cores along the endless path;
    winding means located adjacent the endless path for receiving the cores from the transporter, winding an insulating material onto the cores, and returning the cores to the transporter;
    curing means located adjacent the endless path for curing the insulating material wound onto the cores;
    removing means located adjacent the endless path for removing the cured insulating material from the cores;
    wherein the cores are carried around the endless path by the transporter in a plurality of spaced apart groups having equal numbers of the cores, each group extending along the transporter over a first given length;
    wherein adjacent groups of cores on the transporter are normally spaced apart on the transporter a distance equal to or greater than the first given length; and
    the curing means including means to detach one entire group of cores from the transporter at one time, to cure said one group of cores, and then to return the entire one group of cores to the transporter forward of the following group of cores.

2. An apparatus according to claim 1 characterized in that means (6) for coating the cured insulating material are provided in connection with the transporter (1) after the curing means (5), said means (6) operating in synchronization with the winding means (4).

3. An apparatus according to claim 1, characterized in that means (7) for removing cores and for splitting the insulation are provided in connection with the transporter (1) after the curing means (5), said means (7) operating in synchronization with the winding means (4).

4. An apparatus according to claim 1, characterized in that the winding means (4) are arranged to detach a core (12) from the transporter (1) for the time of the winding and to return it on to the transporter after the winding has been completed.

5. An apparatus according to claims 1, 2, 3, or 4, characterized in that the transporter (1) is arranged to move around via two idler wheels (2, 3) preferably positioned in the same plane and to support each core (12) in a detachable manner at both ends (22) thereof.

6. An apparatus according to claims 2, 3 or 5, characterized in that the coating means (6) as well as the core removing and insulation splitting means (7) are provided within the upper portion of the path of movement of the transporter.

7. An apparatus according to claim 5, characterized in that the transporter (1) comprises core supports (26) unrotatable with respect to the transporter, the supports (26) comprising separate supporting means (27, 32) for the cores in the top and bottom portions of the transporter (1) so that the force of gravity causes the core (12) to be displaced from one supporting means to the other (27 → 32 and 32 → 27, respectively) at the idler wheels (2, 3) of the transporter (1).

8. An apparatus according to claim 7, characterized in that the supporting means within the upper portion of the path of movement of the transporter (1) are formed by wedge-shaped notches (27).

9. Apparatus according to claim 1, wherein: each group of cores has a first core and a last core;
each core defines a central axis, and within each group of cores on the transporter, the central axes of adjacent cores are spaced apart a second given length; and
the drive means includes means (i) to move the transporter along the endless path in a plurality of first discrete steps in response to the first core in each group reaching a predetermined position adjacent the winding means, and (ii) to move the transporter along the endless path in a second discrete step in response to the last core in each group reaching a given position adjacent the winding means.

10. Apparatus according to claim 9, wherein:
each of the first discrete steps has a length equal to said second given length; and
each of the second discrete steps has a length equal to said first given length.

* * * * *

UNITED STATES PATENT AND TRADEMARK OFFICE
CERTIFICATE OF CORRECTION

PATENT NO. : 5,091,037
DATED : February 25, 1992
INVENTOR(S) : Osmo Soikkeli

It is certified that error appears in the above-indentified patent and that said Letters Patent is hereby corrected as shown below:

In the Abstract, line 6: "means of or" should read as --means for--
Column 1, line 49: "&hat" should read as --that--
Column 3, line 46: "ar" should read as --an--
Column 4, line 63, Claim 1: "the" should read as --a--

Signed and Sealed this

Thirteenth Day of July, 1993

Attest:

MICHAEL K. KIRK

*Attesting Officer*   Acting Commissioner of Patents and Trademarks